United States Patent

Oosone

[15] 3,677,556

[45] July 18, 1972

[54] MAGNETIC RECORDING AND REPRODUCING DEVICE

[72] Inventor: Koozo Oosone, Tokyo, Japan

[73] Assignee: Sony Corporation, Tokyo, Japan

[22] Filed: June 11, 1969

[21] Appl. No.: 832,233

[30] Foreign Application Priority Data

June 13, 1968 Japan....................................43/40716

[52] U.S. Cl...........................................274/4 C, 179/100.2 Z

[51] Int. Cl...........................................................G11b 27/24

[58] Field of Search.................274/4 B, 4 C, 4 E, 11 B, 11 C; 242/197–200; 179/100.2 Z

[56] References Cited

UNITED STATES PATENTS

| | | | |
|---|---|---|---|
| 2,466,514 | 4/1949 | Vagtberg | 179/100.2 Z UX |
| 2,612,565 | 9/1952 | Heller | 179/100.2 Z UX |
| 3,037,093 | 5/1962 | Nowlan | 274/4 C UX |
| 3,416,150 | 12/1968 | Lingberg | 274/4 H X |
| 3,488,058 | 1/1970 | Staar | 274/4 E |
| 3,507,501 | 4/1970 | Lear | 179/100.2 Z X |
| 3,417,938 | 12/1968 | Markakis | 274/4 E |

*Primary Examiner*—William D. Martin, Jr.
*Assistant Examiner*—Dennis A. Dearing
*Attorney*—Albert C. Johnston, Robert E. Isner, Lewis H. Eslinger and Alvin Sinderbrand

[57] ABSTRACT

An auto-reverse type magnetic recording and reproducing device for Philips type cassettes which has means for detecting faulty-erasure-preventing means provided in the cassettes so as to avoid faulty erasure of recorded signals on the tape during recording not only in a forward direction but also in a reverse direction.

9 Claims, 13 Drawing Figures

INVENTOR.

KOOZO OOSONE

INVENTOR.

KOOZO OOSONE

INVENTOR.

KOOZO OOSONE

Patented July 18, 1972

3,677,556

6 Sheets-Sheet 4

INVENTOR.

KOOZO OOSONE

INVENTOR.

KOOZO OOSONE

INVENTOR.

KOOZO OOSONE

MAGNETIC RECORDING AND REPRODUCING DEVICE

BACKGROUND OF THE INVENTION

1. Field of the Invention

This invention relates to a magnetic recording and reproducing device, and more particularly to a reversible type magnetic recording and reproducing device for use with cassettes having means for preventing faulty erasure of recorded signals.

2. Description of the Prior Art

Tape cartridges, for example, the so-called Philips type cassettes, have removable tongues or tabs which, so long as they are present, indicate the propriety of erasing signals recorded on the tape, and once the tongues or tabs have been removed, indicate that recording is no more possible with the cassettes. Accordingly, the tape cartridges or cassettes of this type do not permit faulty erasure of necessary recorded signals and hence are convenient for practical use. With most existing magnetic recording and reproducing devices for use with the tape cartridges, however, recording and reproducing are achieved during movement or transfer of the tape only in one direction, so that after recording on a first track or reproducing therefrom the cartridge is turned upside down for subsequent recording on a second track or reproducing therefrom. be erased for recording other signals thereon. When the signals previously recorded on the track may be erased, the magnetic recording and reproducing device is put in its recording condition and, upon completion of the recording of signals on that track, a mechanism for reversal of the tape transfer direction is actuated in such a manner that automatic reversal of the tape transfer direction is effective. This may also be achieved manually. In this case, if recording is possible on the other track, the tape is continuously transported in the reverse direction for subsequent recording and, if recording is not permitted, tape transportation is stopped and signals previously recorded on the track are not erased.

Accordingly, the principal object of this invention is to provide a magnetic recording and reproducing device for tape cartridges or cassettes which avoids faulty erasure of signals previously recorded on the tape.

Other objects, features and advantages of this invention will become apparent from the following description taken in conjunction with the accompanying drawings.

DESCRIPTION OF THE PREFERRED EMBODIMENTS

Figure 1:
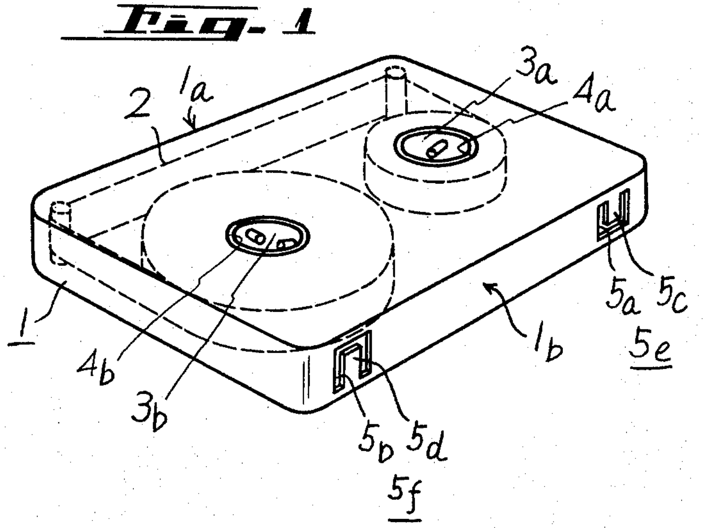
FIG. 1 is a perspective view showing one example of a cassette usable in a recording and reproducing device according to this invention.

In a cartridge type magnetic recording and reproducing device (hereinafter referred to as a cassette tape recorder), a cassette 1 such as is shown in FIG. 1 is used. In the cassette 1, a magnetic tape 2 is secured at its ends to hubs 3*a* and 3*b*, respectively, and wound thereon. The hubs 3*a* and 3*b* are designed to be driven in alignment with apertures 4*a* and 4*b*, provided in the upper and lower walls of the casing of the cassette 1. The cassette 1 has a plurality of windows or opening (not shown) formed in its front side 1*a*, through which a magnetic head, a capstan, a pinch roller and so on are urged into contact with the tape 2 when the cassette 1 is mounted in position on the cassette tape recorder. The so called Philips type cassette is a widely used cassette of the above-mentioned type.

The cassette 1 has a pair of depressions or cutouts 5*a* and 5*b* formed in its rear side 1*b*, and which are normally covered by tabs 5*c* and 5*d* in a manner to define U-shaped slits. The tabs 5*c* and 5*d* may be broken off, if signals previously recorded on the tape are not to be erased. In the figure the tabs 5*c* and 5*d* respectively correspond to forward and reverse recording, so that, for example, when the tab 5*c* has been removed, recording on the tape in the forward direction is to be prevented. Reference numerals 5*e* and 5*f* generally designate detecting portions of the cassette respectively constituted by cutout 5*a* and tab 5*c* and by cutout 5*b* and tab 5*d*, and by which the propriety of erasing previously recorded signals and recording anew is determined.

More specifically, in the presence of the tabs 5*c* and 5*d* forward magnetic recording on the tape can be automatically followed by the reverse recording but, in the absence of the tab 5*d*, upon completion of the forward recording, the recording operation should be automatically stopped to avoid recording on the reverse magnetic track.

Figure 2:
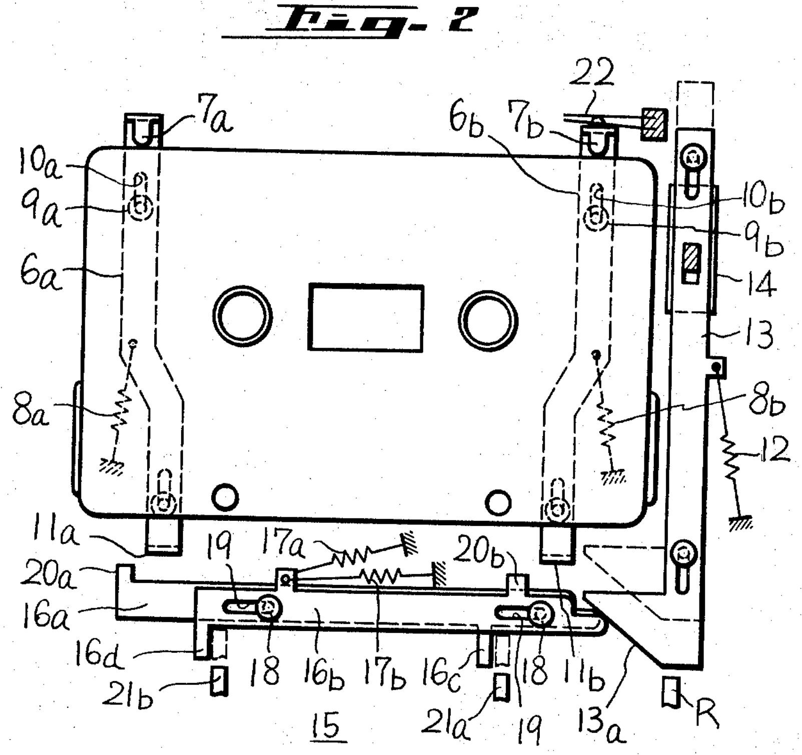
FIG. 2 is a plan view of the principal assembly of one example of a magnetic recording and reproducing device according to this invention.

As illustrated in FIG. 2, in a cassette tape recorder according to this invention a pair of detecting levers 6*a* and 6*b* are provided to underlie the cassette at positions corresponding to the aforementioned detecting portions 5*e* and 5*f* when the cassette 1 has been mounted in position on the cassette tape recorder. Rear ends 7*a* and 7*b* of the levers 6*a* and 6*b* are bent to form forwardly directed projections and the detecting levers 6*a* and 6*b* are always biased forwardly by means of springs 8*a* and 8*b* in a manner to hold the projections 7*a* and 7*b* of the levers 6*a* and 6*b* in contact with the detecting portions 5*e* and 5*f*. Pins or screws 9*a* and 9*b* extend from the chassis (not shown) and engage in slots 10*a* and 10*b* to guide the detecting levers 6*a* and 6*b* in forward and backward directions. In addition, forward end portions 11*a* and 11*b* of the detecting levers 6*a* and 6*b* are bent upward to form abutments.

Reference numeral 13 indicates a record lever which is slidable in forward and backward directions substantially parallel with the detecting levers 6*a* and 6*b* and is always biased by a spring 12 in the forward direction. The record lever 13 is associated with a switch 14 and when the lever 13 lies in such a position as indicated by full line in FIG. 2, the switch 14 is effective to dispose an amplifier circuit (not shown) of the cassette tape recorder in its playback condition, while when the lever 13 has been moved back to a position indicated by broken line the amplifier circuit is disposed by the switch 14 into its recording condition. The record lever 13 has a slanted or inclined face 13*a* formed at its forward end portion.

In front of the pair of detecting levers 6*a* and 6*b* there is provided a control device 15 which is adapted to be movable in a direction that is transverse to the direction of movement of the levers 6*a* and 6b substantially at right angles thereto. In the example shown in FIG. 2 the control device 15 consists of a pair of levers 16*a* and 16*b* which are slidable individually in a transverse direction and springs 17*a* and 17*b* are provided for biasing levers 16*a* and 16*b* toward the right, as right, as viewed, thereby holding one end of each of the levers 16*a* and 16*b* in engagement with the slant face 13*a* of the record lever 13 at all times. In the illustrated example the sliding levers 16*a* and 16*b* are shown to partly overlap each other but they may be positioned and dimensioned to be coextensive. Reference numeral 18 designates pins or screws extending from the chassis and which guide the sliding levers 16*a* and 16*b* in the transverse direction by engagement in slots 19 formed through the levers 16*a* and 16*b*. The levers 16*a* and 16*b* have engaging members 20*a* and 20*b* which are engageable with the abutments 11a and 11b of the detecting levers 6*a* and 6*b*, as will be described later. More specifically, when the record lever 13 lies in the position indicated by the broken line on FIG. 2 and the projections 7a and 7b of the detecting levers 6a and 6b have been inserted into the depressions or cutouts 5a and 5b uncovered by removing the tabs 5c and 5d of the detecting portions 5e and 5f and consequently when the detecting levers 6a and 6b have been pushed forward, the engaging members 20a and 20b of the sliding levers 16a and 16b respectively engage the abutments 11a and 11b of the detecting levers 6a and 6b. Reference numerals 16c and 16d indicate projections formed on the sliding levers 16a and 16b, which projections are engageable by levers described later to limit their movement. Reference character R designates a recording operation lever associated with a record button or safety button of the cassette tape recorder. Reference numerals 21a and 21b indicate constant-speed forward and reverse drive levers which are associated with a constant-speed drive actuation button for forward and reverse recording and reproducing, and which, as mentioned above, are engageable by projections 16c and 16d. These levers 21a and 21b normally lie at locations indicated in full lines on FIG. 2, but are shifted, for example, by pushing a push button, to positions indicated by broken lines. Accordingly, the cassette tape recorder is rendered operative for reproducing signals recorded on the forward or reverse track of the tape by actuating the lever 21a or 21b with the lever 13 in the position indicated by full lines in FIG. 2, and the tape recorder is made operative for recording on the forward or reverse track of the tape by actuating the lever 21a or 21b, subsequent to the actuation of the lever R to displace lever 13 to the broken line position. Since the construction for actuating levers 21a, 21b and R is not related directly to this invention, no detailed description will be given thereon.

The operation of the cassette tape recorder of the above construction will now be described for the case where the detecting portions 5e and 5f of the cassette 1 are in the condition depicted in FIG. 1, that is, the tabs 5c and 5d 5b have not been removed. As shown on FIG. 2 when the tabs 5c and 5d are present, the detecting levers 6a and 6b are held in their rearward position against the action of springs 8a and 8b. Further, since the record lever 13 lies in its playback position, that is, in its forward position, the sliding levers 16a and 16b of the control device 15 are shifted to left by the slant face 13a of the record lever 13. As a result of this, the constant-speed forward and reverse drive levers 21a and 21b may be selectively operated, by which signals recorded on the forward and reverse tracks can be selectively reproduced, as above described.

Figure 3:
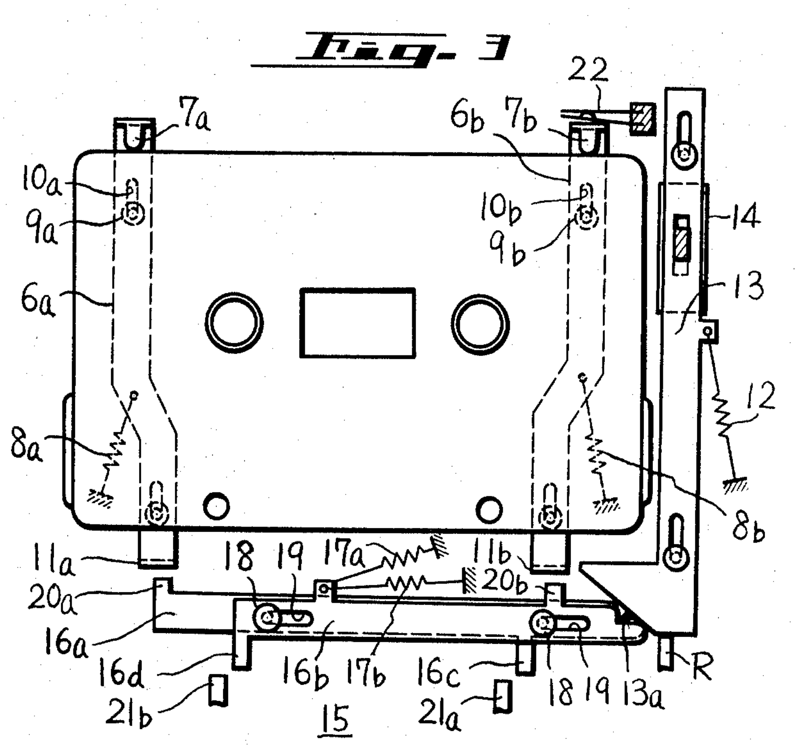
FIGS. 3 to 6 are similar plan views showing the principal assembly of FIG. 2 in its various operative conditions.

By actuating the recording operation lever R to rearwardly displace record lever 13, the cassette tape recorder is converted to the condition depicted in FIG. 3, in which case the sliding levers 16a and 16b of the contro device 15 are slid to the right. In such condition, the constant-speed levers 21a and 21b can be selectively operated, so that recording can be achieved on the forward and reverse tracks so long as tabs 5c and 5d remain on the cassette.

For automatic continuation of the recording signals on the reverse track of the tape following completion of recording on the forward track in the case where the depressions 5a and 5b of the detecting portions 5e and 5f are still covered by the tabs 5c and 5d as shown in FIG. 3, the following means is provided. A switch 22 is associated with the detecting lever 6b and is adapted to be held in the on state when the lever 6b is in its rearward position (when the projection 7b of the lever 6b is not inserted into the depression or cutout 5b the detecting portion 5f) as shown in FIG. 2. Further, a signal generator 24 is mounted on a shaft 23 which is inserted into one of the apertures 4a and 4b of the cassette 1 and is thereby coupled with the respective hub 3a or 3b in a rotatable manner. As shown on FIG. 7, signal generator 24 consists of a circular magnet 25 mounted on the shaft 23 and magnetism detecting means, for example, a magneto diode 26 disposed in opposing relation to the magnet 25. The output of the signal generator 24 is applied through an amplifier 27 to a rectifier 28 to be rectified by the latter. The rectified output is fed to a transistor 30 through the aforementioned switch 22 and a Schmit circuit 29. The transistor 30 is adapted to be rendered conductive to actuate a change-over mechanism 31 such as a solenoid or the like connected thereto only when the output of the signal generator 24 is cut off or interrupted. In addition, a switch 32 is connected in parallel to the switch 22 and is ganged with the cassette tape recorder in such a manner, for example, by suitable actuation by the levers 21a and 21b, that during forward recording or reproducing a common contact C of the switch 32 is held on a contact N and that during reverse recording or reproducing the contact C is held on an open contact R.

In order to ensure reproducing from the reverse track following completion of reproducing from the forward track irrespective of the condition of the detecting portions 5e and 5f while the cassette tape recorder is in its playback condition, a change-over switch 33 is connected in parallel to the switch 22 and is ganged with the cassette tape recorder, for example, actuable by the aforementioned record lever 13, in such a manner that during reproducing a common contact C of the switch 33 is engaged with a contact PB and that during recording the contact C is turned to an open contact REC.

With the use of such a circuit, the switch 22 is in the on state when in the condition shown in FIG. 3. Accordingly, the forward recording can be achieved by operating the lever 21a, and when the tape has been completely wound up on one of the hubs by movement of the tape in a forward direction, further rotation of shaft 23 is prevented and, in response thereto, signal supply from generator 24 to the transistor 30 is stopped to render it conductive. When transistor 30 is thus made conductive, solenoid 31 is operated to actuate the reverse drive lever 21b of the recorder, whereby to carry out continuous recording on the reverse track. Upon completion of recording on the reverse magnetic track, the signal from the generator 24 is cut off again to render the transistor conductive to again actuate the solenoid 31, and this second actuation of solenoid 31 may be employed to stop the operation of the tape recorder.

Figure 4:
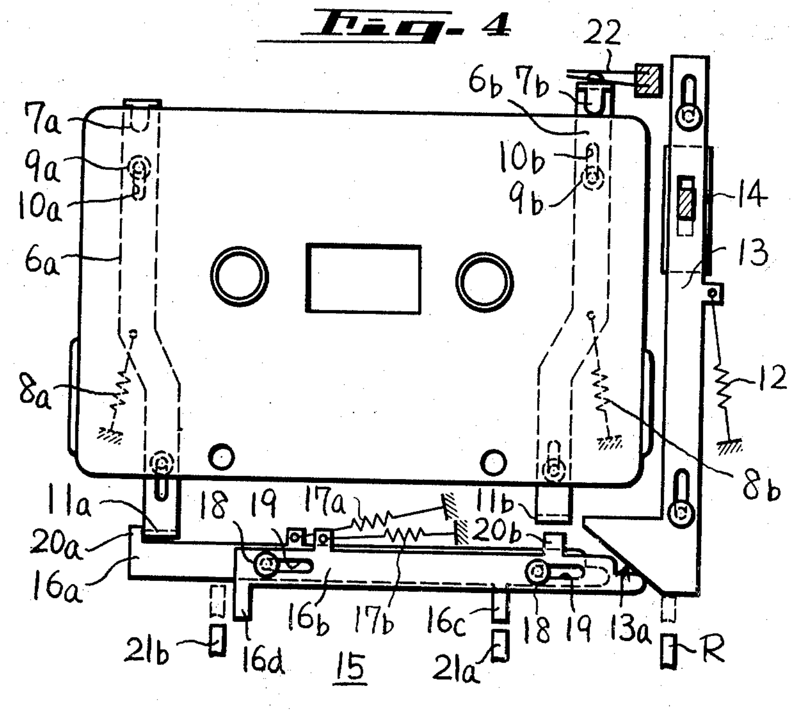

In the event that only the tab 5c of the detecting portion 5e has been removed to uncover the depression or cutout 5a, the detecting lever 6a lies in its forward position as depicted in FIG. 4, in which case the projection 20a on sliding lever 16a is caused to engage the detecting lever 6 when the record lever 13 is move rearwardly, and, at the same time, the projection 16c formed on the lever 16a is brought to a position opposite the constant-speed forward drive lever 21a to bar operation of the lever 21a. However, the constant-speed reverse drive lever 21b can be operated, so that recording can be achieved only on the reverse track.

Figure 5:
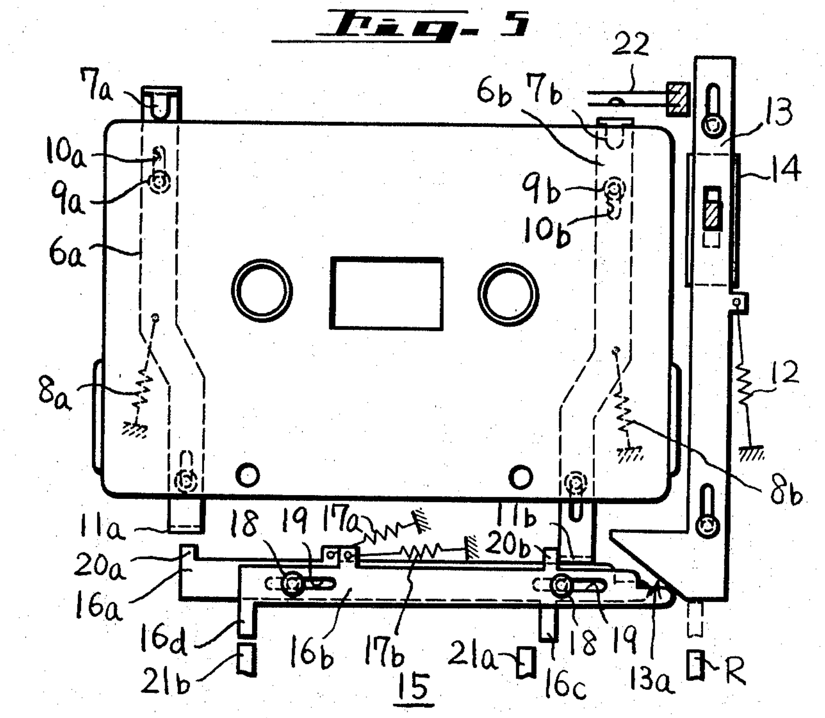

In the case where the tab 5d of the detecting portion 5f has been broken off to uncover the depression 5b, the detecting lever 6b lies in its forward position as shown in FIG. 5 to turn off the switch 22. Under these conditions, when record lever 13 is moved rearwardly, the projection 20b of the sliding lever 16b engages the detecting lever 6b to bring a projection 16d of the sliding lever 16b to a position opposite the constant-speed reverse drive lever 21b and bar operation of the latter, so that recording cannot be achieved on the reverse track.

However, since the drive lever 21a can be operated, recording can be achieved on the forward track. Upon completion of recording on the forward track, the output from the signal generator 24 is cut off to turn on the transistor 30 to actuate the solenoid 31, by which the cassette tape recorder is reversed to commence movement of the tape in the reverse direction. In this case, however, the switch 22 has been held in the off state and the switch 32 is turned off by the reversal of the recorder, so that the solenoid 31 is actuated again to stop the operation of the cassette tape recorder. Therefore, recording can be effected on the forward track but recording on reverse track can be automatically prevented.

Figure 6:
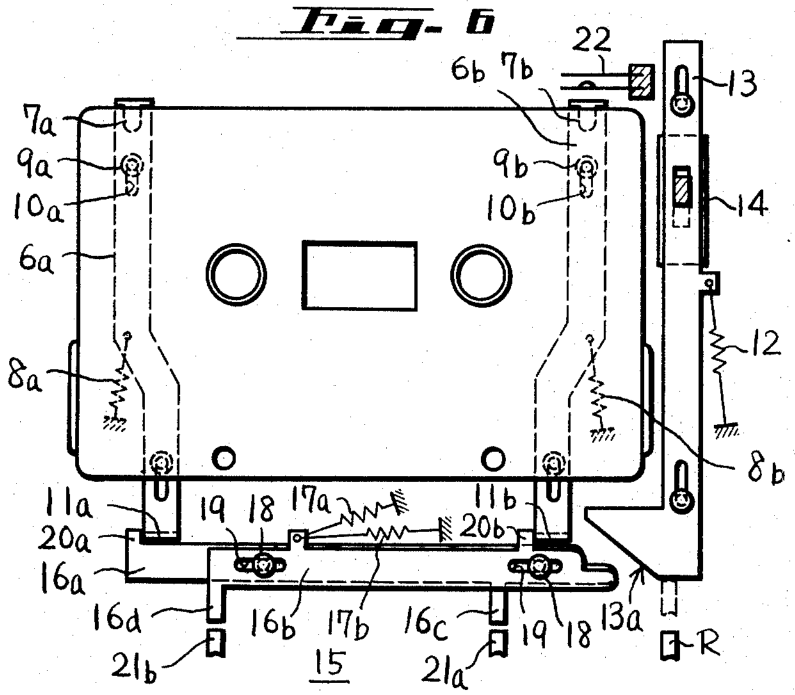

In the event that the tabs 5c and 5d of the detecting portions 5e and 5f have been removed to uncover the depressions 5a and 5b, the cassette tape recorder is in a condition shown in FIG. 6, in which case the both constant-speed drive levers 21a and 21b cannot be operated.

When the cassette tape recorder is in its playback condition depicted in FIG. 2, the switch 33 is held on the contact PB, so that even if the switch 22 is held in the off state, that is, the tab 5*d* of the detecting portion 5*f* has been removed, reproducing from the reverse track can be effected.

Figure 8:
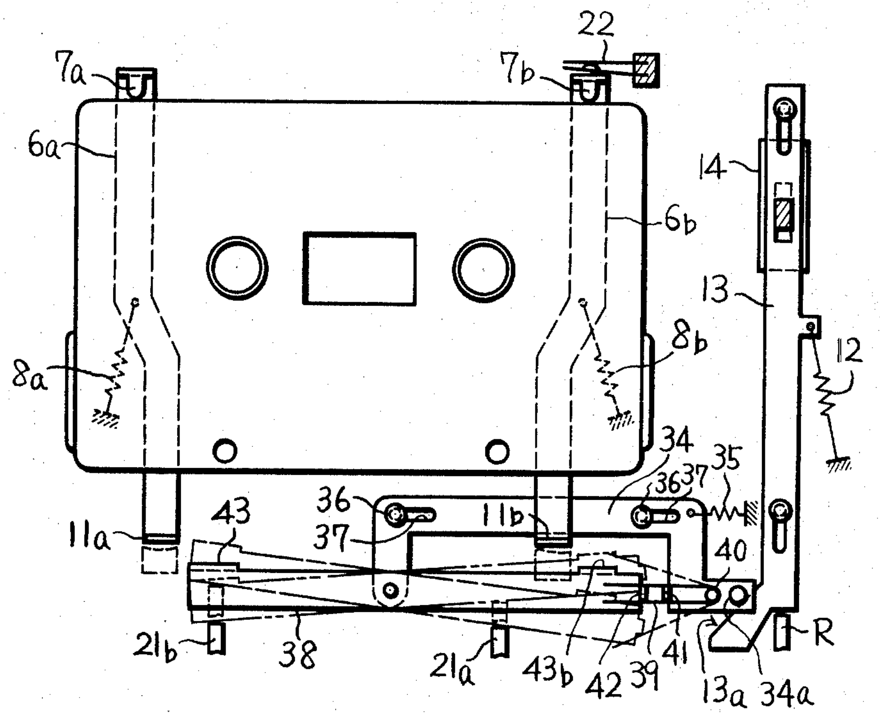
FIG. 8 is a plan view, similar to FIG. 2, showing another example of the device of this invention.

In FIGS. 8 to 13 there is illustrated another embodiment of this invention, which employs a control device different from control device 15 in the foregoing example. This embodiment employs a single sliding lever 34 in place of the levers 16*a* and 16*b*, and the lever 34 is similarly biased by a spring 35 toward the record lever 13 so that a pin 34*a* mounted at one end of the lever 34 engages the slant face 13*a* of the lever 13. The sliding lever 34 is adapted to be guided transversely by engagement of pins 36 in slots 37 formed in lever 34 and the lever 34 has a two-armed lever 38 pivoted intermediate its ends on one free end of the lever 34. Further, the sliding lever 34 has a hairpin spring 39 secured thereto by a pin 40 and a projection 41 on the lever 34 and a projection 42 on the free end of the pivoted lever 38 are located between arms of the hairpin spring 39. Moreover, marginal portions of the pivoted lever 38 at both ends of the side facing toward the cassette are bent down to provide tabs 43a and 43b engageable with the abutments 11a and 11b of the detecting levers 6*a* and 6*b*, as will be described later. Accordingly, where the depressions 5*a* and 5*b* are still covered by the tabs 5*c* and 5*d*, actuation of the constant-speed forward drive lever 21a while the remainder of the device is in the playback condition of the recorder as depicted in FIG. 8 causes the pivoted lever 38 to turn to a position indicated by two-dot chain line and actuation of the constant-speed reverse drive lever 21*b* leads to turning of the pivoted lever 38 to a position indicated by dash-dot line, thus permitting playback of the forward and reverse tracks. Upon releasing the lever 21*a* 21*b* to permit its return to the position shown in full lines on FIG. 8, (for example, by pushing a stop button, not shown), the lever 38 is automatically returned by the spring 39 to the position indicated in full lines. More speciffically, there is no obstacle to pivoting of lever 38 under the conditions shown in FIG. 8, so that it can be freely turned to the positions indicated in dash-dot line and in two-dot chain line.

Figure 9:
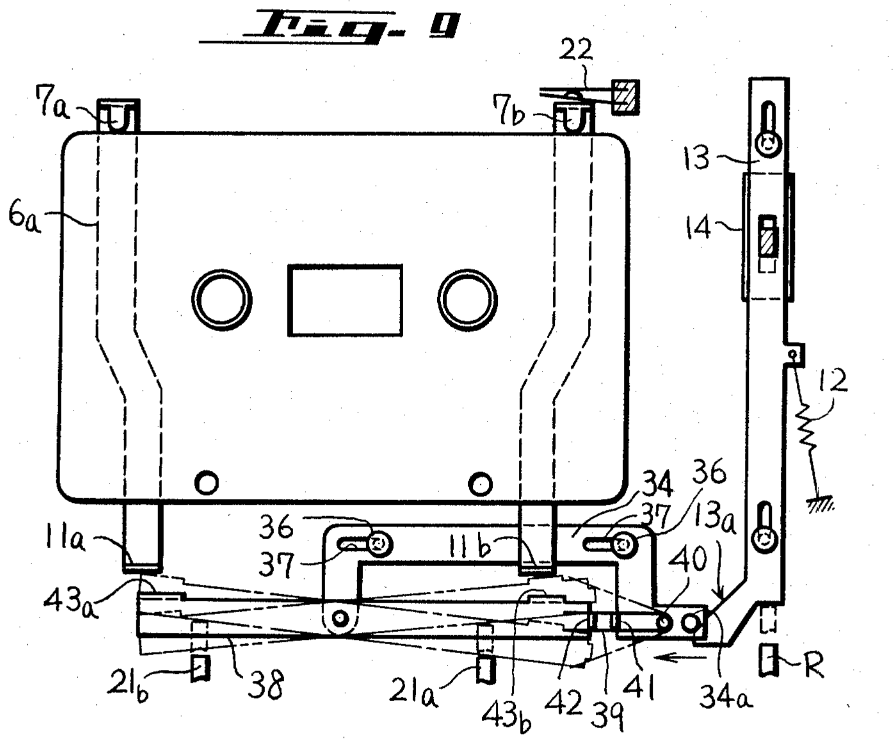
FIG. 9 to 12 are partial plan views showing the device of FIG. 8 in its various operative conditions.

In FIG. 9, the cassette tape recorder is shown in its operative condition for recording, in which case, too, both constant-speed drive levers 21*a* and 21*b* may be operated and hence recording can be effected on the forward and reverse tracks.

Figure 10:
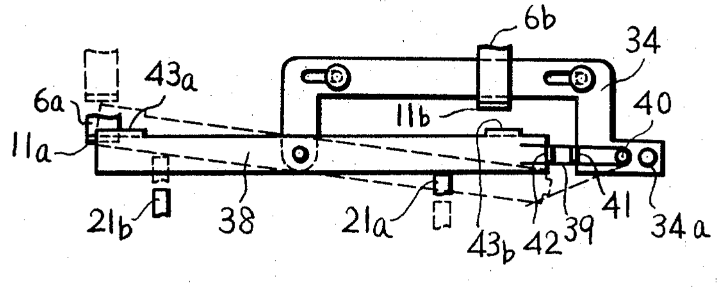
Figure 13:
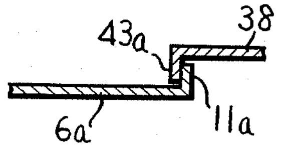
FIG. 13 is an enlarged, fragmentary cross-sectional view showing parts of the device of FIG. 8 in of its operative conditions.

FIG. 10 shows the case in which the depression or cutout 5*a* of the detecting portion 5*e* is uncovered. When the cassette is mounted on the recorder, the detecting lever 6*a* is slid forward, so that when the recording lever 13 is slid backward by actuating the operating lever R for recording, the sliding lever 34 is slid to the left as viewed on the drawing to bring the tab 43*a* of the pivoted lever 38 in front of engaging portion or abutment 11*a* of the of the rotary lever 38 into engagement with that 11*a* of the detecting lever 11*a* as illustrated in FIGS. 10 and 13. Accordingly, in this case pivoted lever 38 cannot be rocked in the clockwise direction and the constant-speed forward drive lever 21*a* cannot be displaced rearwardly, so that recording on the forward track is impossible. However, since the constant-speed reverse drive lever 21*b* is operable, recording on the reverse track is possible.

Figure 11:
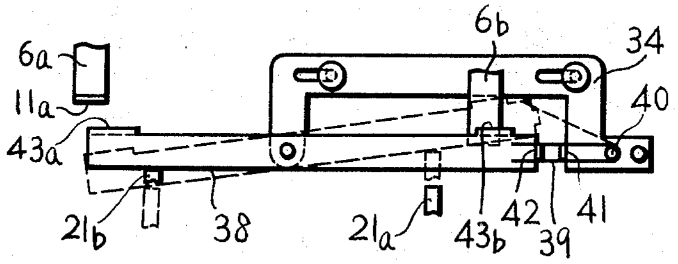

In FIG. 11 there is illustrated the case where the depression or cutout 5*b* of the detecting portion 5*f* is not covered by the tab 5*d*. In this case, the tab 43*b* of the rotary lever 38 is brought into contact with the abutment 11*b* of the detecting lever 6*b* by the actuation of the recording lever 13 after the cassette 1 has been mounted on the recorder, with the result that the constant-speed reverse drive lever 21*b* cannot be operated. However, the constant-speed forward drive lever 21*a* can be operated, permitting recording on the forward track. In this case the switch 22 is in the off state as in the case of FIG. 5, so that when the tape recorder has been reversed by the actuation of solenoid 31 after completion of recording on the forward track, the solenoid 31 is immediately operated again to stop the operation of the tape recorder, thus preventing recording on the reverse track.

Figure 12:
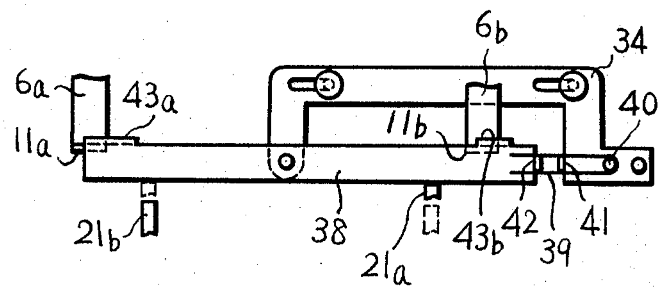

FIG. 12 illustrates the case where the depressions or cutouts 5*a* and 5*b* of the detecting portions 5*e* and 5*f* are not covered by the tabs 5*c* and 5*d*. In this case, the abutments 11*a* and 11*b* of the detecting levers 6*a* and 6*b* engage tabs 43*a* and 43*b*, respectively of the pivoted lever 38, so that the both constant-speed drive levers 21*a* and 21*b* cannot be operated, that is, recording on the forward and reverse tracks is prevented.

With the present invention described above, recording on the forward and reverse tracks can be adequately controlled by controlling the constant-speed forward and reverse drive levers 21*a* and 21*b* depending upon the conditions of the detecting portions 5*e* and 5*f* of the cassette 1 while the cassette tape recorder is in its operative condition for recording. Thus, faulty erasure of recorded signals can be avoided. Further, during playback the recorded signals can be reproduced by operating the lever 21*a* or 21*b* irrespective of the conditions of the detecting portions 5*e* and 5*f*.

Figure 7:
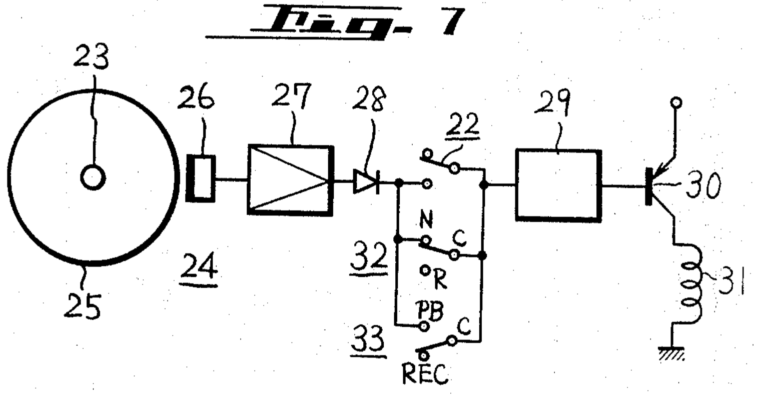
FIG. 7 is a circuit diagram of a reversing control usable in this invention.

Further, the provision of the control circuit shown in FIG. 7 ensures that if recording is to be prevented on one of the tracks, for example, on the reverse track only, recording on this track can be automatically prevented upon completion of recording on the forward track.

The cassette tape recorder described above is designed so that upon completion of recording or reproducing for the reverse track while the recorder is in its operative condition for this operation, (that is, when the tape has been wound up on one hub to stop rotation of the rotary shaft 23, the solenoid 31 is actuated to stop the operation of the tape recorder, but since the means for this operation is not related directly to the present invention, a detailed description thereof is omitted.

It will be apparent that many modifications and variations may be effected without departing from the scope of the novel concepts of this invention.

I CLAIM AS MY INVENTION

1. A control device of a magnetic recording and reproducing apparatus for use with a tape cassette containing a tape having first and second tracks in which signals are to be recorded and reproduced during transfer of the tape in forward and reverse directions, respectively, and including first and second removable portions which, by their presence and absence, indicate the absence and pressure, respectively, of recorded signals which are to be preserved in said first and second tracks; said control device comprising first and second detecting members engageable with a cassette on the recording and reproducing apparatus for detecting the presence or absence of said first and second removable portions, respectively, of the cassette, a record control member movable from a reproducing position corresponding to the reproducing mode of operation of the apparatus to a record position corresponding to the recording mode of operation of the apparatus, first and second tape transfer control members which are displaceable for initiating the transfer of the tape in said forward and reverse directions, respectively, and blocking means rendered operative in response to movement of said record control member to said record position to be engaged by each of said first and second detecting members which detects the absence of the respective removable portion from the cassette, said blocking means, when engaged by said first and second detecting members, being effective to block the displacement of said first and second tape transfer control members, respectively, whereby to prevent recording of signals in a track of the tape already occupied by recorded signals which are to be preserved.

2. A control device according to claim 1; further comprising automatic reversing control means operative to displace said second tape transfer control member for initiating transfer of the tape in said reverse direction upon the completion of the tape transfer in said forward direction, and prevent means responsive to the detection by said second detecting member of the absence of the respective removable portion from the cassette to prevent the operation of said automatic reversing control means so long as said record control member is in said record position.

3. A control device according to claim 2, in which said automatic reversing control means includes electrically operated actuating means for displacing said second tape transfer control member, and circuit means for operating said actuating means upon said completion of the tape transfer in said forward direction, and in which said prevent means is constituted by switch means interposed in said circuit means and being actuable by said second detecting member to complete said circuit means only upon the detection by the second detecting member of the presence of the respective removable portion on the cassette.

4. A control device according to claim 3 in which said automatic reversing control means further includes additional switch means interposed in said circuit in parallel with the first mentioned switch means, said additional switch means being actuable with said record control member for completing said circuit means only when said record control member is in said reproducing position, so that the direction of tape transfer is automatically reversed when the apparatus is in its reproducing mode of operation even if signals to be preserved are recorded in said second track of the tape.

5. A control device according to claim 1, in which said detecting members are movable in directions that are generally parallel to each other and are displaced from inoperative positions to operative positions in response to their detection of the absence of the respective removable portions from the cassette, yieldable means urging said blocking means to move transversely with respect to said directions of movement of the detecting members in response to said movement of the record control member to said record position, and each of said detecting members has means thereon which, when in said operative position thereof, acts on said blocking means to dispose the latter in the path of said displacement of the respective tape transfer control member.

6. A control device according to claim 5, in which said record control member is movable in a direction substantially parallel to said directions of movement of the detecting members and has a surface at an angle to said direction of movement of said record control member, and said yieldable means urges blocking means into engagement with said surface of the record control member for effecting the movement of said blocking means in response to said movement of the record control member.

7. A control device according to claim 6, in which said blocking means includes first and second blocking elements movable independently of each other transversely with respect to said directions of movement of the detecting members and each yieldably urged against said surface of the record control member, cooperatively engageable means on said first and second detecting members and said first and second blocking elements, respectively, to limit the transverse movements of said first and second blocking elements toward said surface at predetermined positions in response to said movement of the record control member to said record position when said first and second detecting members are in said operative positions thereof, and stop means on each of said first and second blocking elements interposed in said path of displacement of the respective tape transfer control member only when the blocking element is in said predetermined position thereof.

8. A control device according to claim 5, in which said blocking means includes support means which undergoes the movement transversely with respect to said direction of movement of the detecting members, and a lever pivoted on said support means for movement with the latter and having first and second lever portions which are engageable by said first and second detecting members only when said support means is in the position thereof corresponding to said record position of the record control member, said first and second detecting members, when in said operative positions thereof and engaged with said first and second lever portions, being effective to limit pivoting of said lever means in respective first and second directions, said lever means extending across the paths of displacement of said first and second tape transfer control members to block said displacement of the latter when the pivoting of said lever means is limited in said first and second directions, respectively.

9. A control device according to claim 8, in which said record control member is movable in a direction substantially parallel to said directions of movement of the detecting members and has a surface at an angle to said direction of movement of the record control member, and said yieldable means urges said support means into engagement with said surface.

* * * * *